United States Patent [19]

Vincent

[11] 4,396,808
[45] Aug. 2, 1983

[54] TELEPHONE SYSTEM WITH A GROUND OR WIRE RETURN

[76] Inventor: Ogden W. Vincent, 2166 La Miel Way, Campbell, Calif. 95008

[21] Appl. No.: 190,073

[22] Filed: Sep. 23, 1980

[51] Int. Cl.³ .............................................. H04B 3/44
[52] U.S. Cl. .............................. 179/170 J; 179/16 D
[58] Field of Search ................... 179/2.51, 3, 4, 2 BC, 179/16 C, 16 D, 16 E, 16 F, 77, 81 R, 170 J; 370/75, 71

[56] References Cited

U.S. PATENT DOCUMENTS 2,594,019  4/1952  Holman ........................... 179/170 J
4,178,484 12/1979  Vincent ........................... 179/16 C

*Primary Examiner*—Joseph A. Popek

[57] ABSTRACT

A telephone system is described that includes a long line with a plurality of electrical conducting wires from a central office to at least one repeater and to at least one substation. Carrier frequency alternating signals are sent over a balanced pair of wires in the plurality between a first terminal at the central office and a second terminal at the substation. The repeater repeats and amplifies the carrier frequencies. A D.C. power source and/or an audio frequency source at the central office is connected to the plurality via a first line balancing network. The substation receives D.C. current and/or audio frequency current from the plurality via a second line balancing network. The repeater has a third and fourth line balancing network for receiving and bypassing D.C. current and/or audio frequency current in the plurality. The return path for the D.C. source and/or audio frequency source is an electrical conducting return medium which does not use the pair of wires. One such return medium is earth ground. Use of the return medium greatly increases the length of the long line.

14 Claims, 8 Drawing Figures

TELEPHONE SYSTEM WITH A GROUND OR WIRE RETURN

BACKGROUND OF THE INVENTION

1. Field of the Invention

This invention can be used in a telephone system that is described by such names as subscriber carrier system whereby one or more telephone subscribers receive telephone service by a carrier system. However, this system for utilization of earth ground or a separate wire for a return path can also be used for all telephone systems where D.C. power is required to power either repeaters and/or remote terminals.

2. Description of the Prior Art

There have been a great number of subscriber telephone systems designed in the past. These systems all use the first wire of the transmission line to connect the positive side of a D.C. power source and use the second wire of the transmission line to connect the negative side of the D.C. power source for a return. The D.C. power source is fed to the line by a balanced network such as a pair of chokes or a transformer. The D.C. power is used to power repeaters and/or subscriber terminals. This new invention describes a new method of feeding the D.C. power over the line with balancing networks to a return path while using a return path other than the balanced pair. Earth ground or a wire is such a return path.

The invention in U.S. Pat. No. 4,178,484 describes a system which utilizes a return path other than the balanced pair. Some of the principles of invention U.S. Pat. No. 4,178,484 are used in this invention. However, this invention shows some of the principles of U.S. Pat. No. 4,178,484 applied to a carrier system with a repeater intermediately connected.

SUMMARY OF THE INVENTION

A telephone system is described which includes a transmission line. A pair of wires in the transmission line is balanced to earth ground. Higher frequencies from a first terminal at a central office are sent over the pair of wires to a first substation with a second terminal. An intermediately connected first repeater amplifies the higher frequencies. A D.C. source and/or low frequency source is connected to at least one wire of the transmission line at the central office. The return path for the D.C. source and/or low frequency source is a conductor other than the pair, such as earth ground or another wire. D.C. power from the central office is used to power distant telephone equipment such as repeaters and/or terminals. Several methods of using a return path other than the pair are described, the first of which is D.C. power and/or low frequencies sent on one wire of the pair and possibly a third wire with a return via a fourth wire and/or earth ground. The second method is D.C. power and/or low frequencies sent over both wires of the pair and possibly a third wire with a return via earth ground and/or a fourth wire. A third method is D.C. power and/or low frequencies sent over a third wire with a return via a fourth wire and/or earth ground. Three methods of bridging a third terminal on the line at a second substation are described. A first line balancing network is used at the central office. A second line balancing network is used at the substation. A third and fourth line balancing networks are used at the first repeater. A fifth line balancing network is used at the second substation. The line balancing networks are described for the three methods presented.

DETAILED DESCRIPTION

Figure 1:
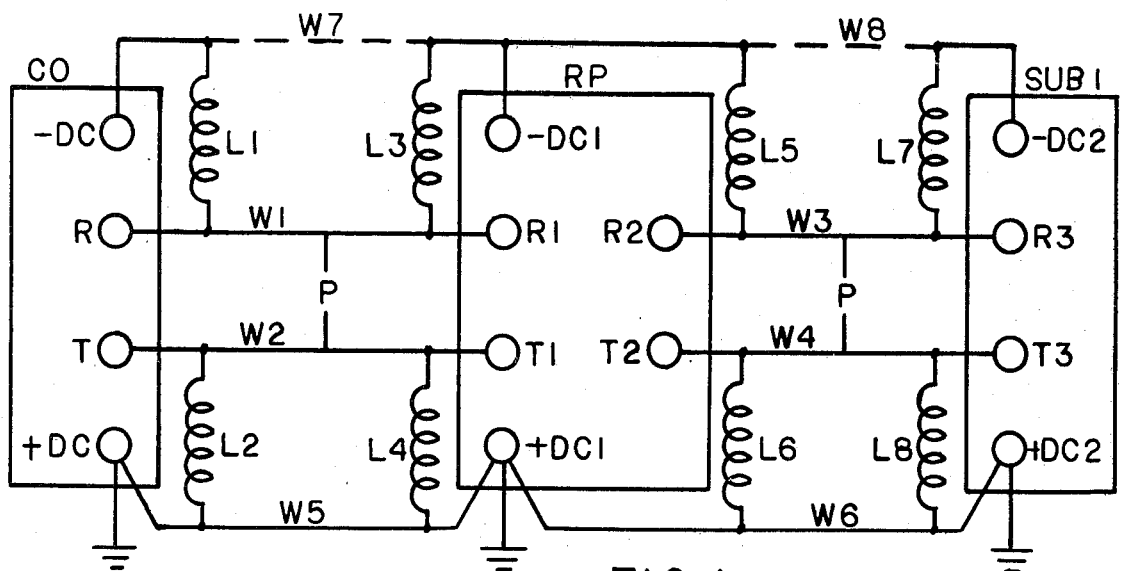
FIG. 1 is a block diagram showing a 2,3, or 4 wire line with a D.C. source connected to the first wire of the pair.
Figure 4:
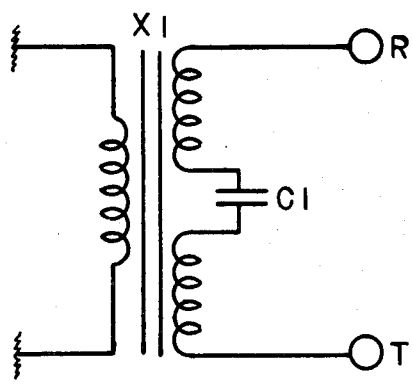
FIG. 4 is a schematic diagram of an input-output transformer with a capacitor.

The following description of the invention is merely one example which will be referred to as the prototype. The claims are not restricted to only the described invention because other configurations are possible. FIG. 1 shows a telephone system which could be a subscriber carrier telephone system. A balanced to ground higher frequency A.C. signal is applied to the tip T and ring R from a first terminal at a central office CO. The balance at T and R may be accomplished by the use of a transformer at the CO which is shown in FIG. 4. Transformer X1 provides the balance, and C1 is a D.C. blocking capacitor. Other balanced feed methods are possible, such as push pull amplifiers, etc. A D.C. voltage source $-DC$ is applied to wire W1 through inductor L1 which effectively A.C. isolates W1 from $-DC$. If used, W7 is a wire that could parallel W1 and is shown dashed to indicate it is optional. Wire W2 is connected to the $+DC$ side of the D.C. source through a balancing inductor L2 which effectively A.C. isolates wire W2 from the D.C. source return $+DC$. Wires W1 and W2 are the first part of a pair of wires which are normally twisted together and balanced to earth ground. Inductors L1 and L2 are equal inductors with L2 balancing L1 to keep wires W1 and W2 balanced to ground. Wire W5 is shown as a possible return path for the D.C. source, W5 being shown in parallel with earth ground. When W5 is used, the CO need not be grounded to the earth. When W5 is not used, the CO must be grounded to earth ground for a return to $+DC$.

In FIG. 1 W1 and W2 connect to the ring R1 and tip T1 at repeater RP which could be the first or second repeater. The input-output circuits of repeater RP at R1, T1 and R2, T2 are each balanced which may be accomplished by a transformer at each output. These transformers are shown in FIG. 4. Other types of balanced output circuits are possible. The power supply for repeater RP is connected to $-DC1$ and $+DC1$ for powering the repeater RP. Line W1 connects to $-DC1$ through inductor L3 which A.C. isolates $-DC1$ from W1. Wire W7 also connects to $-DC1$ when used. Line W2 connects to $+DC1$ through inductor L4 which A.C. isolates +DC1 from W2. Inductors L3 and L4 are of equal value with L4 balancing L3. When W5 is used, it is not necessary to connect +DC1 to earth ground. When W5 is not used, +DC1 must be connected to earth ground for a return to +DC. Wires W3 and W4 are the second part of the pair P of wires which are normally twisted and balanced to earth ground. Wire W3 connects to −DC1 through inductor L5 which A.C. isolates wire W3 from −DC1. Wire W8 is an optional wire which may be used to parallel W3 and is therefore shown dashed. Some D.C. current flows from W1 to W3 via inductors L3 and L5. Wire W4 connects to +DC1 through inductor L6 which A.C. isolates wire W4 from +DC1. Inductors L5 and L6 are of equal value with L6 balancing L5 to keep W3 and W4 balanced to ground. Wire W6 is a return wire, being shown in parallel with earth ground. When W6 is used, it is not necessary to ground +DC1, unless W5 is not used. When W6 is not used, +DC1 and +DC2 must be grounded to earth ground for a return. It is of interest to connote that in FIG. 1 some return D.C. current flows in W2 and W4 because these wires are in parallel with W5 and W6 respectively and also with earth ground when used. Thus, a balanced output such as shown in FIG. 4 is necessary where the output transformer T1 has a split secondary with a capacitor C1 blocking the D.C. flow and connecting the secondaries for A.C. When W5 and W6 are not used, almost all the return current flows through earth ground. Thus, several combinations of W5, W6, and earth ground are possible. In those systems where it is objectionable to have any D.C. current flowing in W2 and/or W4, a large capacitor may be connected in series with L2 and another large capacitor may be connected in series with L6. Series capacitors in series with the balancing inductors L2, L4, L6, and L8 may aid low frequency balancing where balance to ground is important at low frequencies.

In FIG. 1 wire W3 connects to ring R3 at first substation SUB 1 which has a second terminal. Wire W4 connects to tip T3. The input-output circuit at R3 and T3 is balanced, and FIG. 4 shows one possible configuration. The second terminal power supply connects to −DC2 and +DC2. −DC2 connects to W3 via inductor L7 which A.C. isolates −DC2 from W3. When used, W8 also connects to −DC2. +DC2 connects to W4 through inductor L8 which A.C. isolates +DC2 from W4. Inductors L7 and L8 are equal, L8 balancing L7. The D.C. return current from +DC2 flows in W2, W4, W5, W6, and earth ground. It is optional as to the use of W6 and earth ground.

Figure 2:
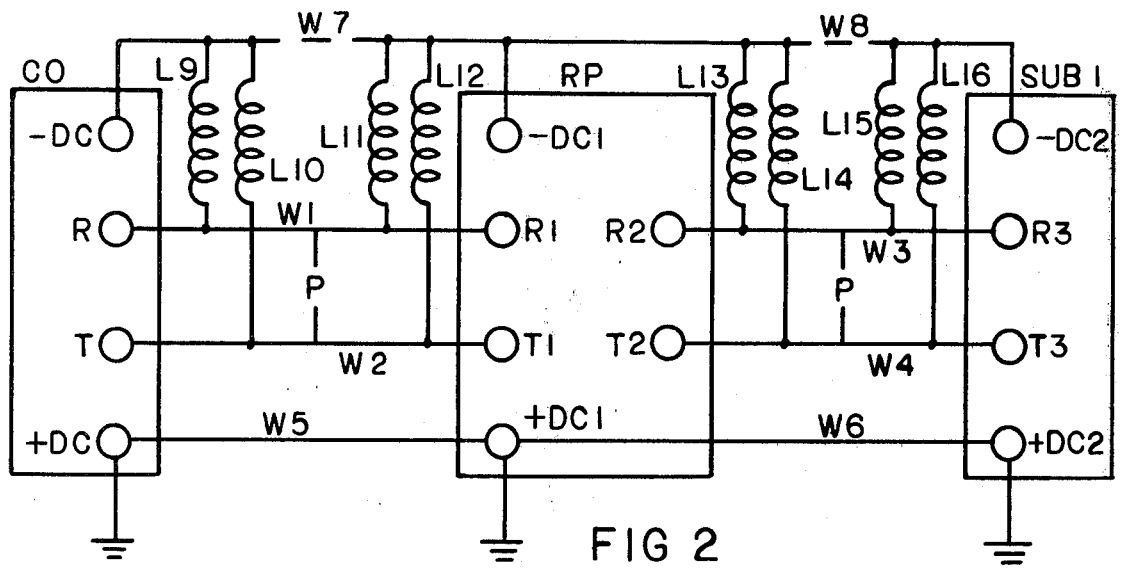
FIG. 2 is a block diagram showing a 2, 3, or 4 wire line with a D.C. source connected to both wires of the pair.
Figure 5:
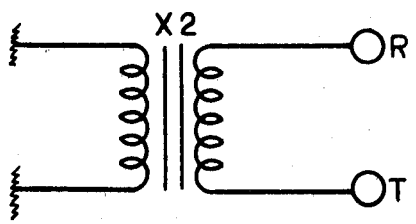
FIG. 5 is a schematic diagram of an input-output transformer.

FIG. 2 shows another telephone system in which the meanings for parts marked the same as in FIG. 1 have the same meanings as in FIG. 1. In this prototype part of the D.C. current from −DC flows to W1 through inductor L9, and part of the D.C. current from −DC flows to W2 through inductor L10. Inductors L9 and L10 are equal and A.C. isolate −DC from W1 and W2, L10 balancing L9. Inductors L9 and L10 may be wound together as a transformer. The use of W5 and W7 is optional as in FIG. 1. The D.C. currents in W1 and W2 flow in the same direction and are normally equal. One output configuration for the first terminal at T and R is shown in FIG. 5 where no capacitor is required. X2 is an input-output transformer.

In FIG. 2 −DC1 connects to W1 via inductor L11 and connects to W2 via inductor L12. Inductors L11 and L12 are equal and A.C. isolate −DC1 from W1 and W2, L12 balancing L11. L11 and L12 may be wound together as a transformer. Part of the current from −DC1 flows through L12 and part through L11, the parts being normally equal. Wire W3 connects to −DC1 via inductor L13. Wire W4 connects to −DC1 via inductor L14. Inductors L13 and L14 are normally equal, and the currents through them are normally equal. L13 and L14 may be wound on the same form as a transformer. The use of W6 and W8 is optional as in FIG. 1.

In FIG. 2 −DC2 connects to W3 via inductor L15 and connects to W4 via inductor L16 with L16 balancing L15. Inductors L15 and L16 are normally equal and isolate −DC2 from W3 and W4, the currents through L15 and L16 being normally equal.

Figure 3:
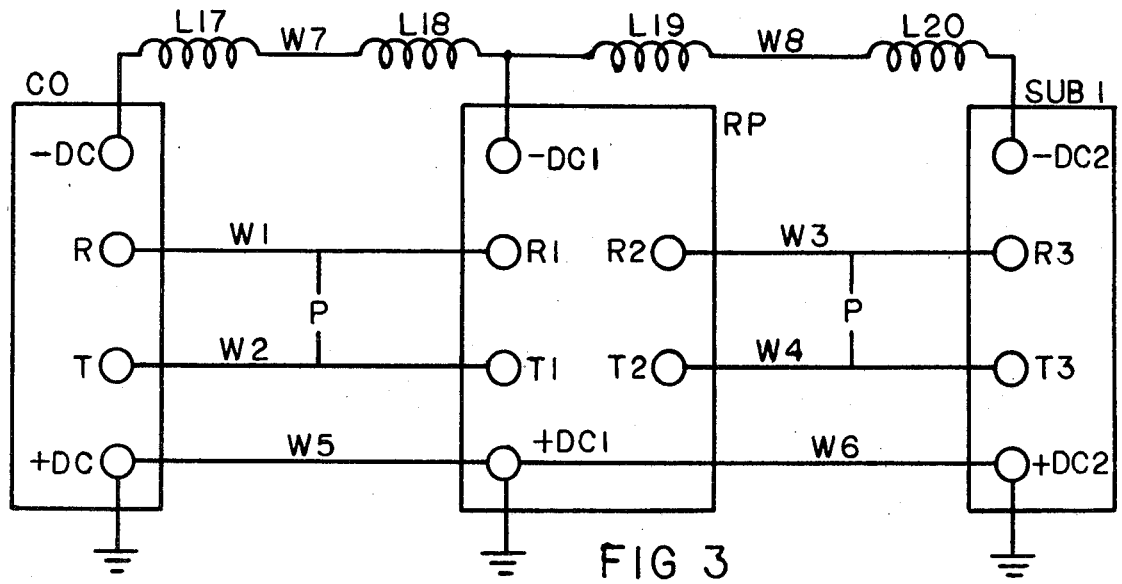
FIG. 3 is a block diagram showing a 3 or 4 wire line with a D.C. source connected to a third wire.

FIG. 3 shows another telephone system in which the meanings for parts marked the same as in FIG. 1 have the same meanings as in FIG. 1. In this prototype −DC connects to W7 via inductor L17 which A.C. isolates W7 from −DC. Wire W7 connects to −DC1 via inductor L18 which A.C. isolates −DC1 from W7. W8 connects to −DC1 via inductor L19 which A.C. isolates W8 from −DC1. The D.C. current from −DC1 flows in L18, and the D.C. current from L19 also flows in L18. −DC2 connects to W8 via inductor L20 which A.C. isolates W8 from −DC2. The use of L17, L18, L19, and L20 merely illustrates one balancing means and may not always be required. Conversly, more elaborate balancing means may be required in some cases, such as inductors in series with wires W5 and W6 at +DC, +DC1, and +DC2. The use of W5 and W6 as a return is optional as in FIG. 1. Therefore, FIG. 3 may be a three or four wire system as the application requires.

Figure 6:
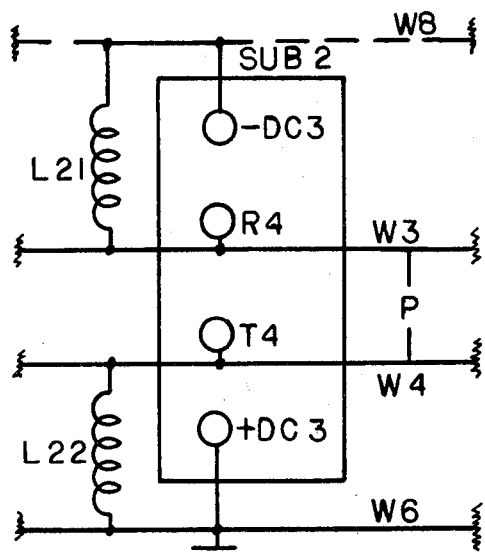
FIG. 6 is a block diagram showing a second substation bridged to a 2, 3, or 4 wire line with a D.C. source connected to the first wire.

In FIG. 6 SUB 2 is a second substation with a third terminal which receives and transmits higher frequencies on the pair P of wires. FIG. 4 shows a suitable input-output circuit for the third terminal attached to R4 and T4 to give balance and D.C. isolation to ring R4 and tip T4. The second substation has a D.C. power supply attached to −DC3 and +DC3 which derives power from the long line. −DC3 is connected to line W3 through inductor L21. +DC3 is connected to line W4 via inductor L22. Inductors L21 and L22 are of equal value with L22 balancing L21. The D.C. return is through W6 and/or earth ground as in FIG. 1. The use of W8 is optional as in FIG. 1. Since FIG. 6 is a bridging connection, no termination is used at the input-output circuit of the third terminal.

Figure 7:
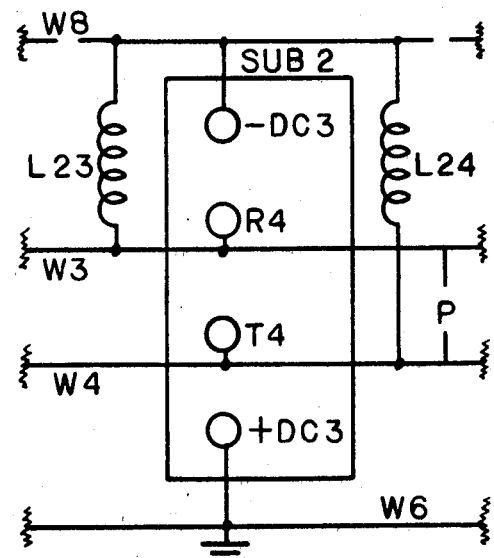
FIG. 7 is a block diagram showing a second substation bridged to a 2, 3, or 4 wire line with a D.C. source connected to both wires of the pair.

In FIG. 7 the designations marked the same as in previous figures have the same meaning as those previously described in FIG. 1 and FIG. 6. −DC3 connects to wire W3 via inductor L23 and connects to wire W4 via inductor L24. Inductors L23 and L24 are of equal value with L24 balancing L23, the currents through L23 and L24 being equal.

Figure 8:
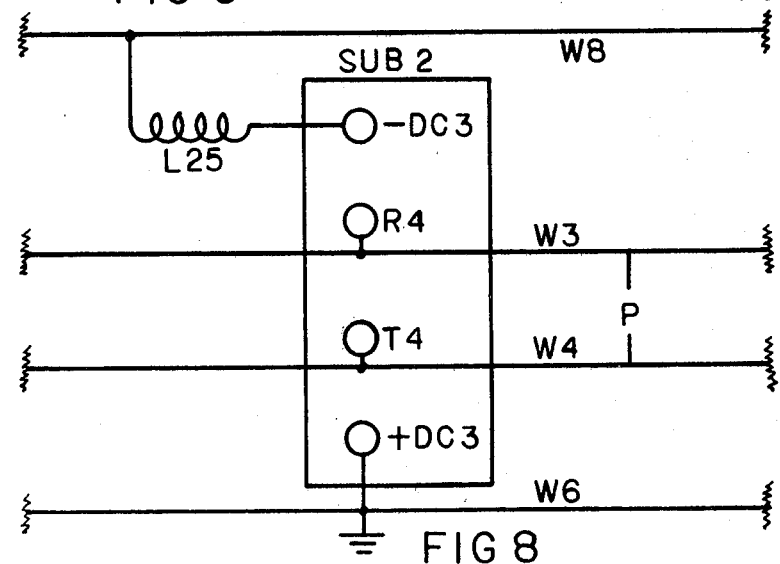
FIG. 8 is a block diagram showing a second substation bridged to a 3 or 4 wire line with a D.C. source connected to a third wire.

In FIG. 8 the designations marked the same as in previous figures have the same meaning as those described in FIGS. 1 and 6. −DC3 connects to wire W8 via inductor L25 which A.C. isolates −DC3 from W8. The return path for +DC3 is through W6 and/or earth ground.

In FIGS. 6, 7, and 8 the second substation SUB 2 is shown bridged onto wires W3, W4, W6, and W8. Other substations may be similarly bridged on wires W3, W4, W6, and W8 just as SUB2 is connected. Alternatively SUB2 and/or other substations may be bridged on wires W1, W2, W5, and W7 just as SUB 2 is shown bridged on W3, W4, W6, and W8 respectively.

The purpose of this new invention is to improve performance and the economics of the system. A long line can be greatly extended by utilizing earth ground as a D.C. return. Using FIG. 1 with earth ground as a return path, one can almost double the line length as far as D.C. current is regarded. Using FIG. 2 with earth ground as a return path, one can almost quadruple the line length as far as D.C. current is regarded.

The prototypes in FIGS. 1, 2, and 3 describe a D.C. power source −DC and +DC superimposed in various ways on the transmission line. Alternatively the D.C. power supply could be a very low frequency supply such as 20 cycles which could easily be filtered out of the balanced pair. Another alternative is a low frequency such as 20 cycles or the voice band superimposed on the D.C. power source when carrier frequencies are transmitted over the pair of wires. Therefore several alternatives to just D.C. are present. The prototype shows one repeater being used in FIGS. 1, 2, and 3 which could be either a first or second repeater. Alternatively, no repeater could be used by deleting the repeater RP and inductors attached to RP and by connecting W1 to W3, W2 to W4, W5 to W6, and W7 to W8. Alternatively, several repeaters such as RP could be used by breaking transmission line W1, W2, W5, and W7 at some point to insert another repeater like RP together with the inductors attached to RP. The power source at the CO supplies power for all the repeaters and substations.

It is to be understood that the embodiment described herein is merely illustrative of the principles of the invention. Various modifications thereto may be effected by persons skilled in the art without departing from the spirit and scope of the invention.

What is claimed is:

1. A telephone system comprising:
    (a) a long line having a plurality of electrical conducting wires that are connected at one end to tip and ring leads at a central office and are connected at the other end to at least one substation, said plurality being used to conduct alternating signals and/or direct current, a first and a second wires of said plurality being a pair that is balanced to earth ground and has an approximate characteristic impedance, at least one repeater being intermediately connected in said plurality,
    (b) said central office having a first terminal for sending and receiving carrier frequencies on said first and second wires, said first terminal having an earth balanced input-output circuit, said central office having a D.C. power source and/or an audio frequency source, said ring and tip connecting to said first and second wires respectively,
    (c) said substation having a second terminal for sending and receiving carrier frequencies on a third and a fourth wires of said plurality, said third and fourth wires being a pair that is balanced to earth ground and has an approximate characteristic impedance, said third and fourth wires being connected to an earth balanced input-output circuit of said second terminal, wherein circuits use some power from said power source and/or said audio frequency source via said plurality,
    (d) said repeater amplifying carrier frequencies and/or audio frequencies, circuits of said repeater using some power from said power source and/or said audio frequency source via said plurality, a first input-output circuit of said repeater being connected to said first and second wires and being balanced to earth, a second input-output circuit of said repeater being connected to said third and fourth wires and being balanced to earth, and
    (e) a return path comprising an electrical conducting return means for returning direct current and/or audio frequency current from said repeater and/or said substation to said central office, a first line balancing means being used to balance said first and second wires to said return means at the interconnection of said central office to said plurality, a second line balancing means being used to balance said third and fourth wires to said return means at the interconnection of said substation to said plurality, a third line balancing means being used to balance said first and second wires to said return means at the interconnection of the first input-output circuit of said repeater, and a fourth line balancing means being used to balance said third and fourth wires to said return means at the interconnection of the second input-output circuit of said repeater.

2. The telephone system of claim 1 wherein said D.C. power source and/or said audio frequency source is connected to said first wire via said first line balancing means, said repeater receiving some D.C. current and/or audio frequency current from said first wire via said third line balancing means, some of the D.C. current and/or audio frequency current from said first wire bypassing said repeater via said third and fourth line balancing means to said third wire, and said substation receiving some D.C. current and/or audio frequency current from said third wire via said second line balancing means.

3. The telephone system of claim 2 wherein said return means is earth ground.

4. The telephone system of claim 2 wherein said return means is a fifth wire of said plurality between said central office and said repeater and a sixth wire of said plurality between said repeater and said substation.

5. The telephone system of claim 1 wherein said D.C. power source and/or said audio frequency source is connected to both said first and second wires via said first line balancing means, said repeater receiving some D.C. current and/or audio frequency current from said first and second wires via said third line balancing means, some of the D.C. current and/or audio frequency current from said first and second wires bypassing said repeater to said third and fourth wires via said third and fourth line balancing means, and said substation receiving some D.C. current and/or audio frequency current from said third and fourth wires via said second line balancing means.

6. The telephone system of claim 5 wherein said return means is earth ground.

7. The telephone system of claim 5 wherein said return means from said repeater to said central office is a fifth wire of said plurality and from said substation to said repeater is a sixth wire of said plurality.

8. The telephone system of claim 1 wherein said D.C. power source and/or said audio frequency source is connected to a fifth wire of said plurality via said first line balancing means, said repeater receiving some D.C. current and/or audio frequency current from said fifth wire via said third line balancing means, some D.C. current and/or audio frequency current from said fifth wire bypassing said repeater to a sixth wire of said plurality via said third and fourth line balancing means, and said substation receiving some D.C. current and/or audio frequency current from said sixth wire via said second line balancing means.

9. The telephone system of claim 8 wherein said return means is earth ground.

10. The telephone system of claim 8 wherein said return means from said repeater to said central office is a seventh wire of said plurality and from said substation to said repeater is an eighth wire of said plurality.

11. The telephone system of claim 8 wherein said D.C. power source and/or said audio frequency source is also connected to said first and/or second wire via said first line balancing means, said repeater also receiving some D.C. current and/or audio frequency current from said first and/or second wire via said third line balancing means, some D.C. current and/or audio frequency current from said third line balancing means going to said third and/or fourth wire via said fourth line balancing means, and said substation receiving some D.C. current and/or audio frequency current from said third and/or fourth wire via said second line balancing means.

12. The telephone system of claim 1 wherein said first and second wires are connected to said third and fourth wires respectively.

13. The telephone system of claim 1 wherein said substation is designated as a first substation and wherein a second substation including a third terminal and a fifth line balancing means is connected to said first and second wires or to said third and fourth wires via said fifth line balancing means.

14. The telephone system of claim 1 wherein said repeater is designated a first repeater and wherein a second repeater including a fifth and sixth line balancing means is connected in said first and second wires or in said third and fourth wires.

* * * * *